United States Patent [19]
Han et al.

[11] Patent Number: 5,448,080
[45] Date of Patent: Sep. 5, 1995

[54] ULTRAFAST OPTICAL SWITCHING DEVICE HAVING A DOUBLE-JUNCTION MULTIPLE QUANTUM WELL STRUCTURE

[75] Inventors: Seon-Gyu Han; Jong-Tai Lee; Byueng-Su Yoo; Tae-Hyung Zyung, all of Daejeon; Young-Wan Choi, Seoul; Pyong-Woon Park; El-Hang Lee, both of Daejeon, all of Rep. of Korea

[73] Assignee: Electronics and Telecommuncations Research Institute, Rep. of Korea

[21] Appl. No.: 274,192

[22] Filed: Jul. 12, 1994

[30] Foreign Application Priority Data

Jul. 15, 1993 [KR] Rep. of Korea ............... 1993-13359

[51] Int. Cl.⁶ .................... H01L 27/14; H01L 31/00
[52] U.S. Cl. .......................... 257/17; 257/22; 257/21; 257/85; 257/184; 359/245; 359/248
[58] Field of Search ............. 257/21, 84, 85, 184, 257/14, 22, 17; 359/248, 245, 246

[56] References Cited

U.S. PATENT DOCUMENTS

| | | | |
|---|---|---|---|
| 5,229,878 | 7/1993 | Tomita et al. | 257/21 X |
| 5,323,019 | 6/1994 | Dutta et al. | 257/21 X |
| 5,324,959 | 6/1994 | Nakamura et al. | 257/21 X |
| 5,329,136 | 7/1994 | Goosen | 257/21 X |

OTHER PUBLICATIONS

A. Mysyrowicz et al–"'Dressed Excitons' in a Multiple-Quantum-Well Structure: Evidence for an Optical Stark Effect With . . . "; Physical Review Letters., vol. 56, No. 25, Jun. 23, 1986, pp. 2748-2751.

J. Feldman et al–"Ultrafast Optical Nonlinearities of Type II $Al_xGa_{1-x}As/AlAs$ Multiple Quantum Wells", Appl. Phys. Lett., vol. 57, No. 15, 8 Oct. 1990, pp. 1520-1522.

*Primary Examiner*—William Mintel
*Attorney, Agent, or Firm*—Larson and Taylor

[57] ABSTRACT

Disclosed is an ultrafast optical switching device having two types of multiple quantum well structures to be connected with each other, the device comprising a semi-insulating substrate; and a first and a second multiple quantum well structure formed sequentially on the substrate and united with each other to produce a double-junction multiple quantum well structure. Each of the multiple quantum well structures has nonlinear optical effects and two life time constants present while switching off in the device. One of the life time constants corresponds to a short life time constant to be determined dependent on electrons in the double-junction multiple quantum well structure and the other of the life time constants corresponds to a long life time constant to be determined dependent on holes and lattices therein. The multiple quantum well structures are formed in such a manner that short life time constants thereof may be in-phase with each other and long life time constants thereof may be out-of-phase to each other. The multiple quantum well structures are formed differently from each other in composition.

8 Claims, 6 Drawing Sheets

ULTRAFAST OPTICAL SWITCHING DEVICE HAVING A DOUBLE-JUNCTION MULTIPLE QUANTUM WELL STRUCTURE

BACKGROUND OF THE INVENTION

1. Field of the Invention

The present invention relates to an ultrafast optical switching device utilizing nonlinear optical effects of a multi-quantum well structure (hereinafter, referred to as "MQWS"), and more particularly to an ultrafast optical switching device having a double-junction MQWS into which two types of MQWS's are united so as to obtain a fast response of optical nonlinearity thereof.

2. Description of the Prior Art

Nonlinear optical effects in semiconductors offer a wide range of potential applications in the field of optical information processing. In particular, GaAs/Al$_{1-x}$Ga$_{1-x}$As quantum well structures, where photocreated electrons of the conduction band and holes of the valence band both find their lowest energetic states in the GaAs layer, exhibit large optical nonlinearities in the vicinity of their band edge. This can be attributed to the enhanced exciton binding energy in two dimensions giving rise to strong and well-resolved excitonic resonances in the absorption spectrum even at room temperature, which can be effectively bleached. In addition to the strength of the optical nonlinearity, a fast nonlinear optical response of the material is an important requirement in the development of optical processing in order to allow fast switching and high repetition rates at low switching energies.

Generally, in different optical switching devices, the on-off rate, or switching rate, thereof is determined dependent on response characteristics of the above-mentioned optical nonlinearity, and the switching time thereof also is determined dependent on the life time of the photoexcited electrons therein.

FIG. 1 is an absorption spectrum showing the relationship between energy of a beam and absorption factor when an input beam is introduced in a typical type of MQWS. In FIG. 1, reference symbol (a) indicates an exciton peak and reference symbol (b) indicates a starting point of the exciton peak. FIG. 2 is a cross-sectional view showing the construction of a conventional single MQWS where the absorption spectrum is presented.

With reference to FIG. 2, the single MQWS 1 includes a plurality of Al$_x$Ga$_{1-x}$As/GaAs layers each of which is composed of an Al$_x$Ga$_{1-x}$As epitaxial film and a GaAs epitaxial film. The plurality of Al$_x$Ga$_{1-x}$As/GaAs layers are formed on a semiconductor substrate (not shown) in such a manner that a wavelength of each beam to be used therein may be coincident with one corresponding to an energy level presented at the exciton peak, as shown in FIG. 1. For each beam to be used in the single MQWS 1, there is a control beam 3 and an input beam 4 having the same wavelength. The input beam 4 is switched by the control beam 3 in the single MQWS and transmitted through the single MQWS to provide a transmitted beam 5, as shown in FIG. 2.

In the single MQWS 1, each pulse width of the above-mentioned beams is set within one picosecond, and electrons in a ground state are photoexcited in the respective Al$_x$Ga$_{1-x}$As/GaAs layers. Then, a high energy state is created in the MQWS. As a result, the input beam 4, the property of which is changed by the control beam 3, is passed through the single MQWS, and thereby there arises a filling of the state of an energy level in the transmitted beam 5. By filling the state, a bleaching occurs in the single MQWS, and then the quantity of light is increased to a much larger extent in the single MQWS.

However, since the bleaching continues to arise only in the range of several nanoseconds up to several tens of nanoseconds by way of recombination of the photoexcited electrons, holes and lattices, the single MQWS has a slow response characteristic in the nonlinear optical effects.

FIGS. 3A and 3B are waveform diagrams showing photoreaction related to the optical pulses applied to the single MQWS when the exciton peak occurs. In detail, FIG. 3A shows the relationship between time and intensity of the input beam 4 or the control beam 3 shown in FIG. 2, and FIG. 3B shows the relationship between time and transmission of the transmitted beam 5 whose property is varied by the control beam 3, and which is transmitted by the control beam 3 in the single multiple quantum well.

As seen in FIG. 3B, by the bleaching in the MQWS, a curve of the rising time (or, ON time of switching) in transmission of the transmitted beam 5 is rapidly changed upward within several picoseconds, but a curve of the falling time )or, OFF time of switching) is slowly changed downward within several nanoseconds.

As has been described, in the single MQWS, the ratio of on-off times of switching is reduced substantially because of the slowly falling time. Therefore the switching speed of an optical switching device is limited in the range of several nanoseconds up to several tens of nanoseconds.

In addition, the above-described MQWS has a limited use in the field of an optical communication system where a switching time of within several tens of picoseconds are required and can be used only in an extremely low temperature. This causes many problems such as the limited use in the ultrafast optical communication system and the non-operation of the single MQWS under room temperature.

SUMMARY OF THE INVENTION

Accordingly, it is an object of the present invention to provide an ultrafast optical switching device by utilizing a double-junction multiple quantum well structure into which two types of multiple quantum well structure are united, so as to overcome the limit of a switching speed within several tens of nanoseconds.

It is another object of the present invention to provide an ultrafast optical switching device having a double-junction multiple quantum well structure which can be operated at room temperature.

In order to achieve the above objects, according to one aspect of the present invention, an ultrafast optical switching device having two types of multiple quantum well structures to be united with each other, comprises a semi-insulating substrate; and a first and a second multiple quantum well structures formed sequentially on the substrate and united with each other to produce a double-junction multiple quantum well structure, each of said multiple quantum well structures having nonlinear optical effects and two life time constants presented. When the device is switched off, wherein one of said life time constants corresponds to a short life time constant to be determined dependent on the quantity electrons in the double-junction multiple quantum well structure and the other of said life time constants corresponds to a long life time constant to be determined dependent on the quantity of holes and lattices therein; wherein said multiple quantum well structures are formed, so that short life time constants thereof may be in-phase with each other and long life time constants thereof may be out-of-phase to each other; and wherein said multiple quantum well structures are formed differently from each other in composition.

In this embodiment, said first multiple quantum well structure is comprised of a plurality of $Al_{x1}Ga_{1-x1}As$/GaAs layers, and said second multiple quantum well structure is composed of a plurality of $Al_{x2}Ga_{1-x2}As$/GaAs layers, wherein x1 is greater than x2.

In this embodiment, said first multiple quantum well structure is comprised of a plurality of $Al_{x1}Ga_{1-x1}As$/$Al_yGa_{1-y}As$ layers, and said second multiple quantum well structure is comprised of a plurality of $Al_{x2}Ga_{1-x2}As$/$Al_yGa_{1-y}As$ layers, wherein x1 is greater than x2.

In this embodiment, said $Al_{x1}Ga_{1-x1}As$ layer is thicker than the $Al_{x2}Ga_{1-x2}As$ layer.

In this embodiment, the long life time constant of said first multiple quantum well structure is equal to that of said second multiple quantum well structure.

In this embodiment, said semi-insulating substrate is etched selectively so as to allow optical transmission.

In this embodiment, said device further comprises a mirror layer formed between the semi-insulating substrate and the double-junction multiple quantum well structure so as to reflect an input beam.

In this embodiment, a total thickness of the double-junction multiple quantum well structure is 1 μm or less.

BRIEF DESCRIPTION OF THE DRAWINGS

This invention may be better understood and its objective and advantages will become apparent to those skilled in the art by reference to the accompanying drawings as follows.

DESCRIPTION OF THE PREFERRED EMBODIMENT(S)

Figure 1:
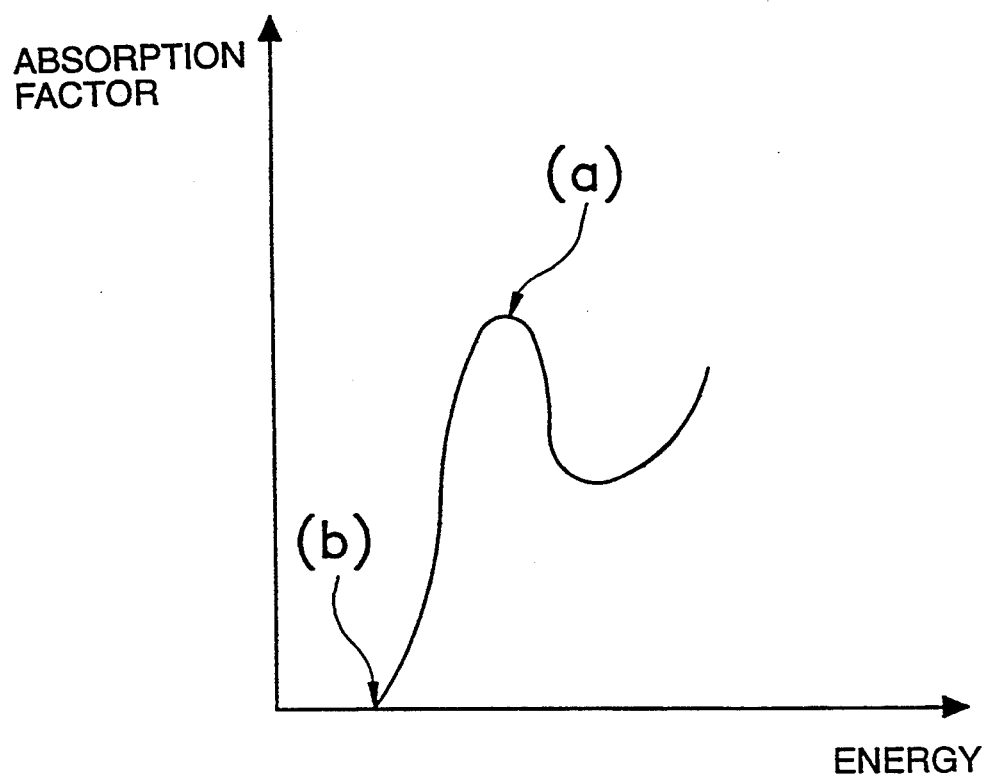
FIG. 1 is an absorption spectrum showing the relationship between an energy of a beam and an absorption factor in a typical structure of a conventional multiple quantum well when an input beam is introduced therein.

Component elements having similar functions to the component elements of the single MQWS (shown in FIG. 2) are indicated by the same reference numerals, and descriptions thereof are omitted.

Figure 2:
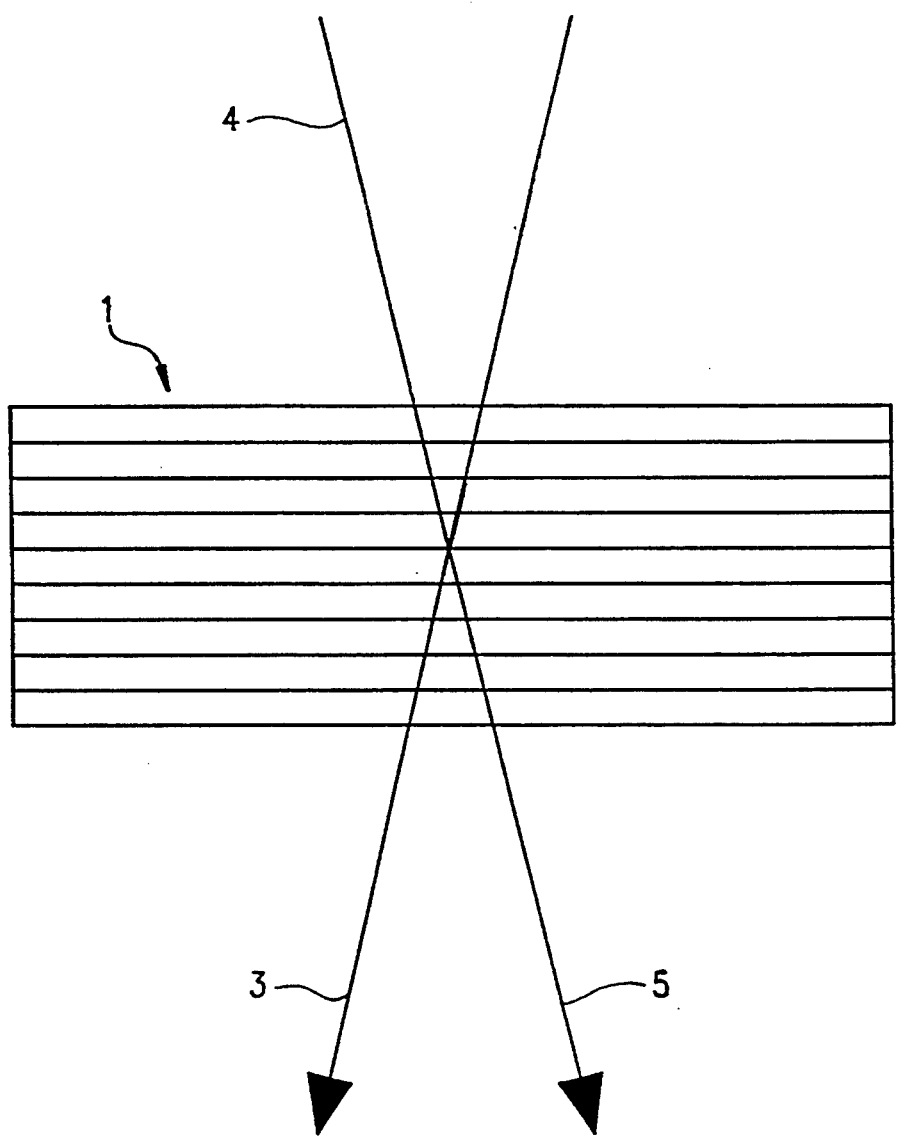
FIG. 2 is a cross-sectional view showing the construction of a conventional single MQWS through which the absorption spectrum of FIG. 1 is presented.
Figure 3A:
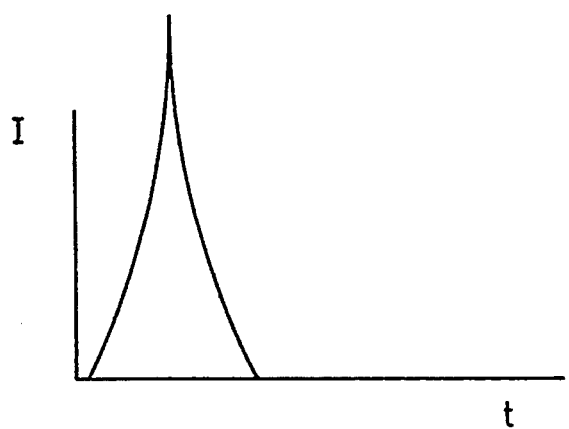
FIGS. 3A and 3B are waveform diagrams showing photoreaction related to the optical pulses applied to the single MQWS when the exciton peak occurs.
Figure 3B:
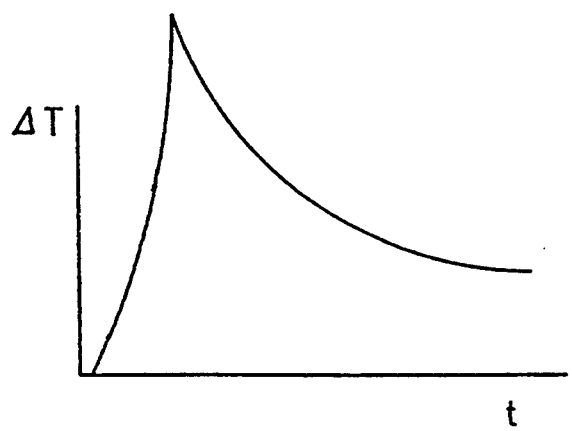
Figure 4A:
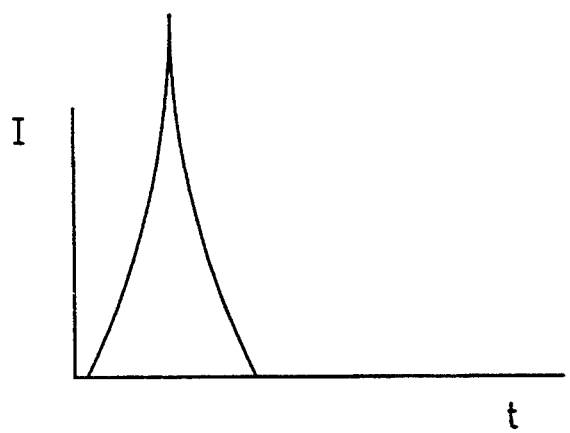
FIGS. 4A and 4B are waveform diagrams showing photoreaction related to the optical pulses applied to the single MQWS when the exciton peak occurs.
Figure 4B:
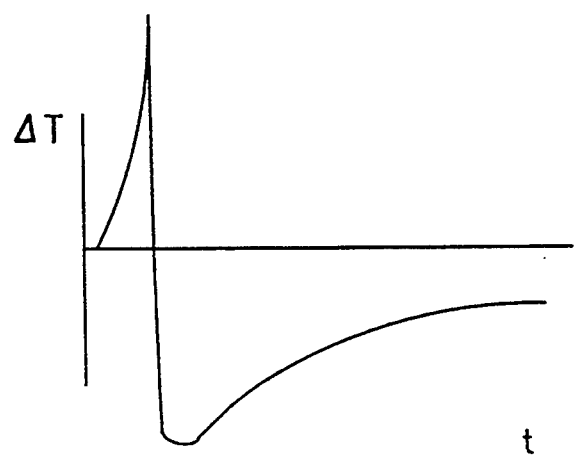

Referring to FIGS. 4A and 4B, it is shown in graphs that the photoreaction take place in relation to the optical pulses applied to the single MQWS at the starting point (b) of the exciton peak as shown in FIG. 1. In detail, FIG. 4A shows the relationship between time and intensity of the input beam 4 or the control beam 3 shown in FIG. 2, and FIG. 4B shows the relationship between time and transmission of the transmitted beam 5 whose property is varied by the control beam 3, and which is transmitted by the control beam 3 in the single multiple quantum well.

Figure 5:
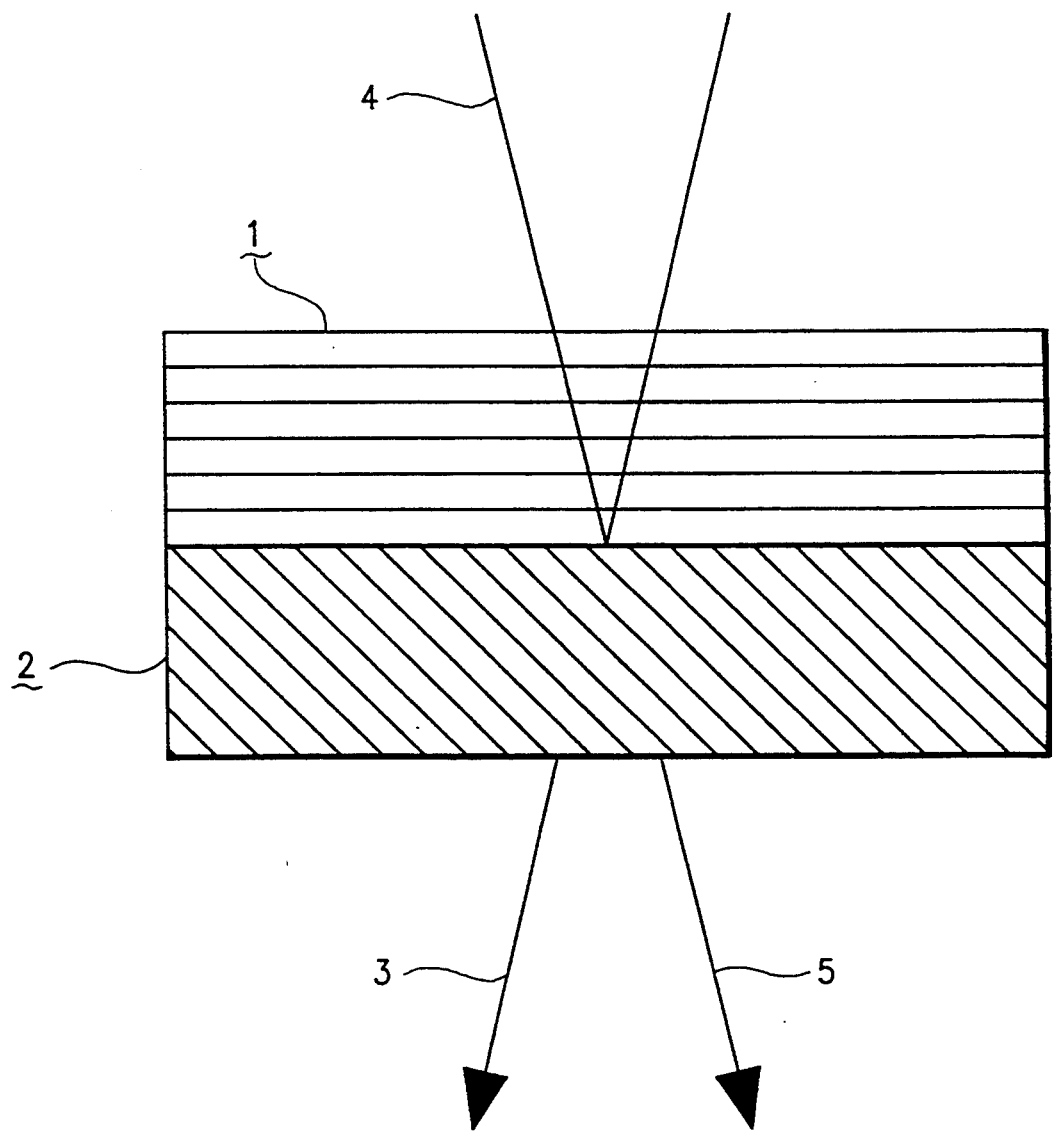
FIG. 5 is a cross-sectional view showing a construction of the double-junction MQWS which is provided in the ultrafast optical switching device according to an embodiment of the present invention.

FIG. 5 is a cross-sectional view showing the construction of the double-junction MQWS which is provided in the ultrafast optical switching device according to an embodiment of the present invention.

In FIG. 5, the double-junction MQWS comprises two types of multiple quantum well structures, a first MQWS 1 and a second MQWS 2. The first MQWS 1 is formed on the second MQWS 2. In the double-junction MQWS according to the present invention, since the single MQWS 1 of FIG. 2 may be used as the first MQWS 1 thereof, descriptions of the first MQWS are omitted.

The second MQWS 2 of FIG. 5 has an absorbing function to allow recovery of a long life time of bleaching occurring upon the first MQWS switching off. The bleaching absorption of this long life time is obtained by variation of composition in respective materials constituting the double-junction MQWS and change of energy as will be described below.

The second MQWS 2 is grown on the first MQWS 1 in such a manner that an energy gap of the second MQWS is smaller than one of the first MQWS. Also, the second MQWS 2 has an exciton peak shifted to a predetermined direction in comparison with the exciton peak of the first MQWS.

Similar to formation of the single MQWS, the second MQWS 2 includes a plurality of $Al_xGa_{1-x}As$/GaAs layers each of which is presented of an $Al_xGa_{1-x}As$ epitaxial film and a GaAs epitaxial film. The plurality of $Al_xGa_{1-x}As$/GaAs layers are formed in such a manner that a wavelength of each beam to be used therein be coincident with one corresponding to an energy level presented at the starting point of the exciton peak.

Additionally, the control beam 3 makes it possible to change characteristics of the second MQWS 2. As shown in FIG. 4B, initially, a bleaching takes place in the second MQWS 2 for several picoseconds, and subsequently an absorbing state occurs in the range of several tens of picoseconds up to several tens of nanoseconds.

For example, the bleaching in the second MQWS 2 takes place at the rising time of the pulse shown in FIG. 4B and the absorbing state therein takes place at the falling time of the pulse. As will be appreciated, during the rise time of the pulse i.e. in the short time term, transmission of the transmitted beam 5 is rapidly increased similarly to the first MQWS. At the falling time thereof i.e. in the long time term, however, the bleaching absorption occurs contrary to the first MQWS.

Accordingly, if the first MQWS 1 is united with the second MQWS 2 which is formed in relatively low composition as compared to the first MQWS 1 so as to produce a double-junction MQWS, the quantity of light is increased because the bleaching states in the first and second MQWS's are linearly combined in the short time term. However, in the long time term, the bleaching in the first MQWS 1 is absorbed by the second MQWS. As a result, in the double-junction MQWS of the present invention, the on-off ratio of switching speed thereof is significantly increased.

With reference to FIG. 5, the processes of forming the double-junction MQWS will be described below. The double-junction MQWS is grown on a semi-insulating GaAs substrate (not shown). Firstly, the second MQWS 2 having approximately 0.5 μm in thickness is grown on the semi-insulating GaAs substrate, and subsequently the first MQWS 1 having thickness of approximately 0.5 μm is grown on the second MQWS. Next, the substrate is selectively removed by a chemical etching method well known in the art in order to allow optical transmission.

Without etching the substrate, the double-junction MQWS may be formed by the following process. After forming a mirror layer on the substrate, the double-junction MQWS is grown on the mirror layer in order to allow beam reflection to the double-junction MQWS. In case of forming the mirror layer, the order of forming the two types of MQWS's can be neglected. That is, after first forming the first MQWS 1 on the substrate, the second MQWS 2 may be grown on the first MQWS 1.

In addition, the double-junction MQWS can be formed by the following process. The two types of MQWS's are separately grown on respectively substrates, and then united with each other so as to produce the double-junction MQWS.

Each MQWS of the double-junction MQWS is comprised of a plurality of $Al_xGa_{1-x}As/GaAs$ layers or a plurality of $Al_xGa_{1-x}As/Al_yGa_{1-y}As$ layers in accordance with a wavelength of each of optical pulses to be used therein. As a growing method of the layers, MBE (molecular beam epitaxy) or MOCVD (metal organic chemical vapor deposition) can be used.

When the double-junction MQWS has the first MQWS comprised of $(Al_{x1}Ga_{1-x1}As)_n/(GaAs)_n$ layers and the second MQWS comprised of $(Al_{x2}Ga_{1-x2}As)_n/(GaAs)_n)$ layers, the double-junction MQWS is formed on the substrate or the mirror layer in such a manner that the composition x1 of the first MQWS is higher than that x2 of the second MQWS.

Additionally, when the layers are formed dependent upon each thickness of the MQWS's, the same effects as those of the above mentioned double-junction MQWS can be obtained. In this case, the double-junction MQWS is formed in such a manner that the first MQWS is thicker than the second MQWS.

The photoreaction of the double-junction MQWS produced above will be described below.

In order to simultaneously control the first MQWS and the second MQWS by the control beam 3, it is necessary to form the double-junction MQWS having thickness of 1 μm or less. When the total thickness of the MQWS's is approximately 1 μm the time difference excited between the MQWS's become about 10 femtoseconds, and therefore there arises no problem in such an optical switching device in which switching operation is performed within several picoseconds.

Figure 6A:
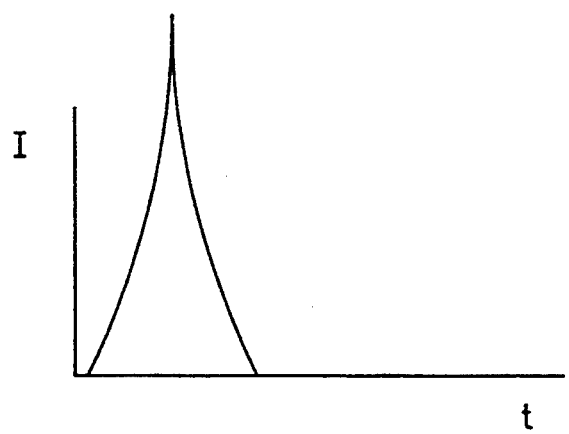
FIG. 6A is a graph showing the relationship between time and intensity of an input beam or a control beam shown in FIG. 5.
Figure 6B:
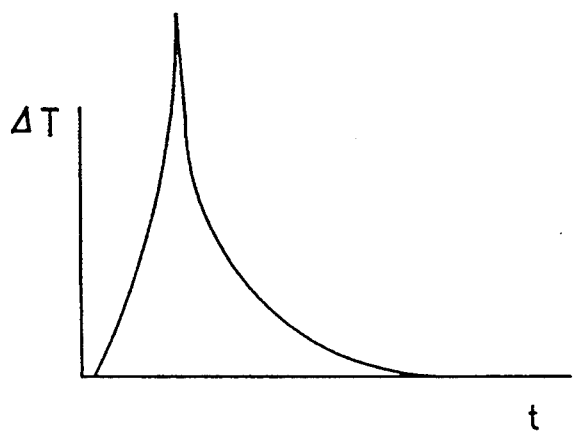
FIG. 6B is a graph showing the relationship between time and transmission of a transmitted beam shown in FIG. 5.

FIG. 6A is a graph showing the relationship between time and intensity of an input beam or a control beam shown in FIG. 5, and FIG. 6B is a graph showing the relationship between time and transmission of a transmitted beam shown in FIG. 5.

Turning to FIG. 5, if the input beam 4 is passed through the first MQWS 1 the optical characteristics of which are changed by the control beam 3, the transmitted beam 5 is changed so as to have relatively increased quantum of light owing to the bleaching in the first MQWS 1. Subsequently, if the transmitted beam changed thus is passed through the second MQWS, the bleaching in the second MQWS is additionally applied to the bleaching in the first MQWS, whereby the intensity of the transmitted beam is significantly increased. As a result, the intensity of the transmitted beam 5 is increased only for a short life time of several picoseconds (immediately after starting of the falling time as shown in FIG. 6B). After the lapse of the short life time of several picoseconds, the second MQWS is performed as an absorber in a long life time.

Therefore, in the double-junction MQWS of the present invention, the intensity of the transmitted beam 5 is increased only for several picoseconds immediately after start of the falling time as shown in FIG. 6B, and after the lapse of the short life time, the bleaching and absorbing are simultaneously performed during the long life time. As a result, the long life time constants of the MQWS's canceled each other, whereby switching off-time of the device is faster.

The photoreaction in the first and second MQWS's is represented by the following two time constants.

$$T1(t) = A1\ e^{-t/\tau 1} + B1\ e^{-t/\tau 2} \quad (1)$$

$$T2(t) = A2\ e^{-t/\tau 3} + B2\ e^{-t/\tau 4} \quad (2)$$

wherein T1(t) is transmission amount of the transmitted beam with respect to time in the first MQWS, T2(t) is transmission amount of the transmitted beam with respect to the time in the second MQWS, τ1 and τ3 are short life time constants to be determined dependent upon the number of electrons in the first and second MQWS's, respectively, and τ2 and τ4 are long life time constants to be determined dependent upon the number of holes and lattices in the first and second MQWS's, respectively. Also, A1, A2, B1 and B2 are integers.

From the above expressions (1) and (2), the following expressions (3) and (4) can be obtained.

$$T(t) = T1(t) + T2(t) \quad (3)$$

$$T(t) = A\ e^{-t/\tau'} + B\ e^{-t/\tau''} \quad (4)$$

whereas, $\tau' = 1 + 3$, $\tau'' = 2 + 4$, $A = A1 + A2$, and $B = B1 + B2$.

From the above expressions (1) and (2), since the arithmetic signs of A1 and A2 are the same, it is understood that the integer A has a relatively high value in comparison with the integer A1 or A2. Accordingly, the intensity of the transmitted beam varies greatly because of the nonlinear optical effects that occur when the device is switched on.

In addition, it can be seen from the above expression (4) that τ2 and τ4 have the same value, because B1 and B2 have arithmetic signs different from each other and τ2 and τ4 have the same long life time constants occurring due to lattices in the MQWS's.

On the other hand, if B1 and B2 have the same absolute value, the second term of the expression (4) can be omitted, and thus the following expression (5) can be obtained.

$$T(t) = A\ e^{-t/\tau'} \quad (5)$$

That is, the short life time constants occurring due to electrons get to be in-phase within several picoseconds (i.e. for the short life time), whereby the intensity of the transmitted beam is increased to a much larger extent, and the long life time constants get to be out-of-phase within several tens of picoseconds up to several tens of nanoseconds (i.e. for the long life time) to be canceled from each other. As a result, the on-off ratio of switching in the device is considerably quicker. The "in-phase" term means that the bleaching in both the first and second MQWS's occurs simultaneously for the short life time, and the "out-of-phase" term means that the bleaching in one of the MQWS's and the absorption in the other of the MQWS's occur for the long life time.

In the optical switching device in which a double-junction MQWS according to the present invention is provided, the response thereof based on exciton nonlinearities becomes faster, as compared to a conventional optical switching device having a single MQWS.

It is understood that various other modifications will be apparent to an can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. An ultrafast optical switching device having two types of multiple well structures connected with each other comprising:
   a semi-insulating substrate; and
   a first and a second multiple quantum well structure formed sequentially on the substrate and united with each other to produce a double-junction multiple quantum well structure, each of said multiple quantum well structures having nonlinear optical characteristics with two life time constants when switching off in the device,
   wherein one of said life time constants corresponds to a short life time constant that is determined dependent on the quantity of electrons in the double-junction multiple quantum well structure and the other of said life time constants corresponds to a long life time constant that is determined dependent on the quantity of holes and lattices in the structure;
   wherein said two multiple quantum well structures are formed in such a manner that said short life time constants thereof may be in-phase with each other and said long life time constants thereof may be out-of-phase to each other; and
   wherein said multiple quantum well structures are formed differently from each other in composition.

2. The ultrafast optical switching device according to claim 1, wherein said first multiple quantum well structure is comprised of a plurality of $Al_{x1}Ga_{1-x1}As/GaAs$ layers, and said second multiple quantum well structure is composed of a plurality of $Al_{x2}Ga_{1-x2}As/GaAs$ layers, wherein x1 is greater than x2.

3. The ultrafast optical switching device according to claim 1, wherein said first multiple quantum well structure is comprised of a plurality of $Al_{x1}Ga_{1-x1}As/Al_yGa_{1-y}As$ layers, and said second multiple quantum well structure is composed of a plurality of $Al_{x2}Ga_{1-x2}As/Al_yGa_{1-y}As$ layers, wherein x1 is greater than x2.

4. The ultrafast optical switching device according to claim 2, wherein the $Al_{x1}Ga_{1-x1}As$ layer is thicker than the $Al_{x2}Ga_{1-x2}As$ layer.

5. The ultrafast optical switching device according to claim 1, wherein the long life time constant of said first multiple quantum well structure is equal to that of said second multiple quantum well structure.

6. The ultrafast optical switching device according to claim 1, wherein said semi-insulating substrate is etched selectively so as to allow optical transmission.

7. The ultrafast optical switching device according to claim 1, and further comprising a mirror layer formed between said semi-insulating substrate and said double-junction multiple quantum well structure so as to reflect an input beam.

8. The ultrafast optical switching device according to claim 1, wherein a thickness of the double-junction multiple quantum well structure is 1 $\mu$m or less.

* * * * *